May 20, 1952 A. B. MACHADO ET AL 2,597,507
AUXILIARY TENS-TRANSFER CONTROL MECHANISM
Filed April 19, 1949 7 Sheets-Sheet 3

INVENTORS.
ANTHONY B. MACHADO
BY GILMAN PLUNKETT

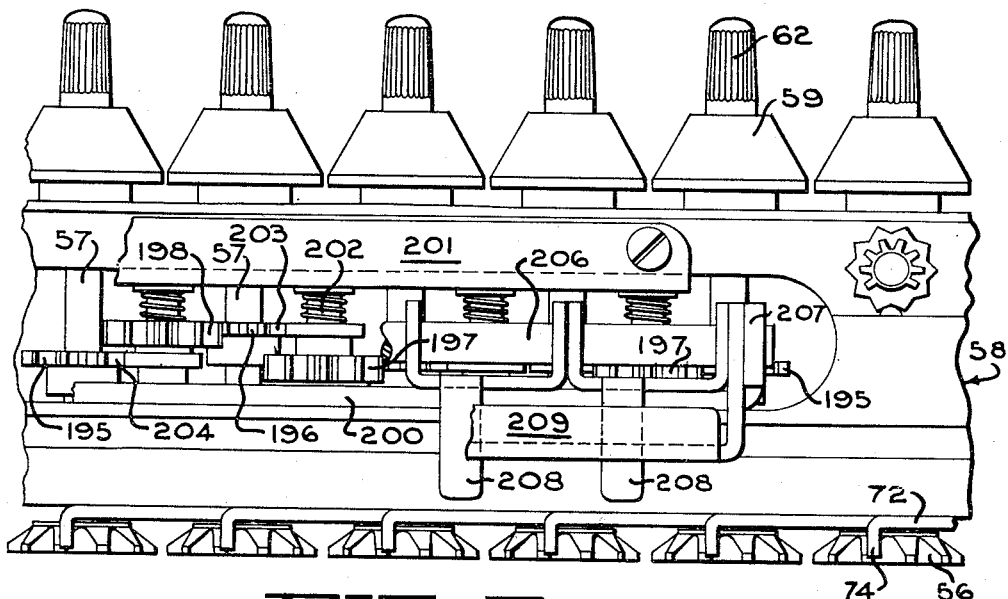
FIG_7
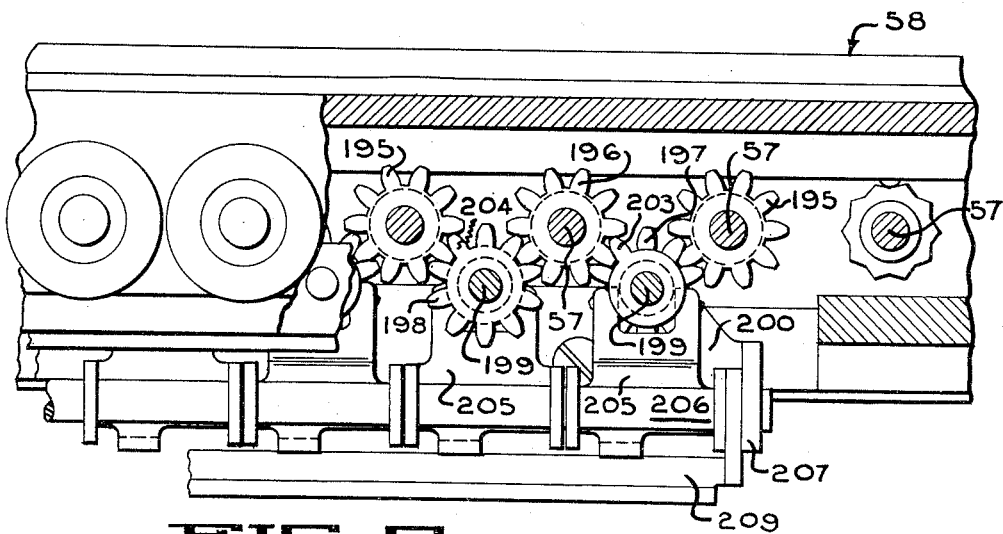
FIG_8
INVENTORS.
ANTHONY B. MACHADO
BY GILMAN PLUNKETT

UNITED STATES PATENT OFFICE 2,597,507

AUXILIARY TENS-TRANSFER CONTROL MECHANISM

Anthony B. Machado and Gilman Plunkett, San Leandro, Calif., assignors to Friden Calculating Machine Co., Inc., a corporation of California Application April 19, 1949, Serial No. 88,448

21 Claims. (Cl. 235—133)

This invention relates to calculating machines and, more particularly, to an improvement in the transfer mechanisms for the registers of such machines.

Certain known types of calculating machines are provided with a shiftable register wheel carriage which is of such a length as to project beyond the stationary portion of the machine within which is located the actuating and transfer mechanisms for the register wheels mounted in the carriage. These machines are therefore generally incapable of effecting the carry-over in those wheels which lie beyond the framework of the main body portion of the machine since the transfer mechanism can only cooperate with those register wheels which are located within the confines of the machine proper. Hence, it has been customary on such machines to provide a warning device for notifying the operator that a transfer has been lost during the calculation so that he may rectify the error by putting in an extra unit by hand.

In accordance with the present invention, this deficiency is overcome by providing an auxiliary transfer mechanism in the register wheel carriage which will automatically take care of the necessary transfers in the outboard order wheels of the register. Suitable means is provided for selectively enabling or disabling the individual orders of the auxiliary transfer mechanism as the carriage moves across the machine so that the main transfer mechanism may always operate in those orders of the register which lie inboard of the machine without any interference from the auxiliary transfer mechanism. Means is also provided for disabling the auxiliary transfer mechanism during zero-setting operations and also during division operations so that this mechanism will not adversely affect the operation of the clearance mechanism or be subjected to unnecessary wear and tear during division operations. Furthermore, the auxiliary transfer mechanism is arranged to be disabled when the machine is in its full cycle position so that the register wheels may be rotated by hand by means of the usual twirler knobs without any interference on the part of the auxiliary transfer mechanism.

Accordingly, it is an object of the present invention to provide an improved transfer mechanism for calculating machines of the type having a shiftable register wheel carriage, whereby the required transfers will be effected in the outboard orders of the register as well as in the inboards orders thereof.

Another object of the invention is to provide an auxiliary transfer mechanism for the outboard orders of the register, this mechanism comprising a series of coupling gears for effectively connecting one order of the register with the next higher order thereof for the transfer of a unit each time the lower order wheel passes through zero, together with means for rendering selected ones of said coupling gears ineffective as the register wheels move inboard of the machine.

Another object of the invention is to provide an auxiliary transfer mechanism for the outboard orders of the register, which mechanism is adapted to be disabled during zero-setting operations of the register.

Another object of the invention is to provide an auxiliary transfer mechanism for the outboard orders of the register, which mechanism is adapted to be disabled during division operations.

Another object of the invention is to provide means for disabling the auxiliary transfer mechanism when the machine is in its full cycle position.

Another object of the invention is to provide an auxiliary transfer mechanism which comprises a series of coupling gears for operatively connecting one order of the register with the next higher order thereof, said coupling gears being adjustably mounted on the carriage so as to enable these gears to be accurately adjusted with respect to associated gears and transfer teeth mounted on the shafts of the register wheels.

Other objects and advantages will become apparent from the following description of a particular embodiment of the invention, as illustrated in the accompanying drawings in which:

Figure 7 is a front elevation of the left-hand end of the register wheel carriage showing a modified form of the auxiliary transfer mechanism.

Figure 8 is a plan view of the carriage with certain parts broken away so as to more clearly illustrate the mechanism shown in Figure 7.

*General description*

Figure 1:
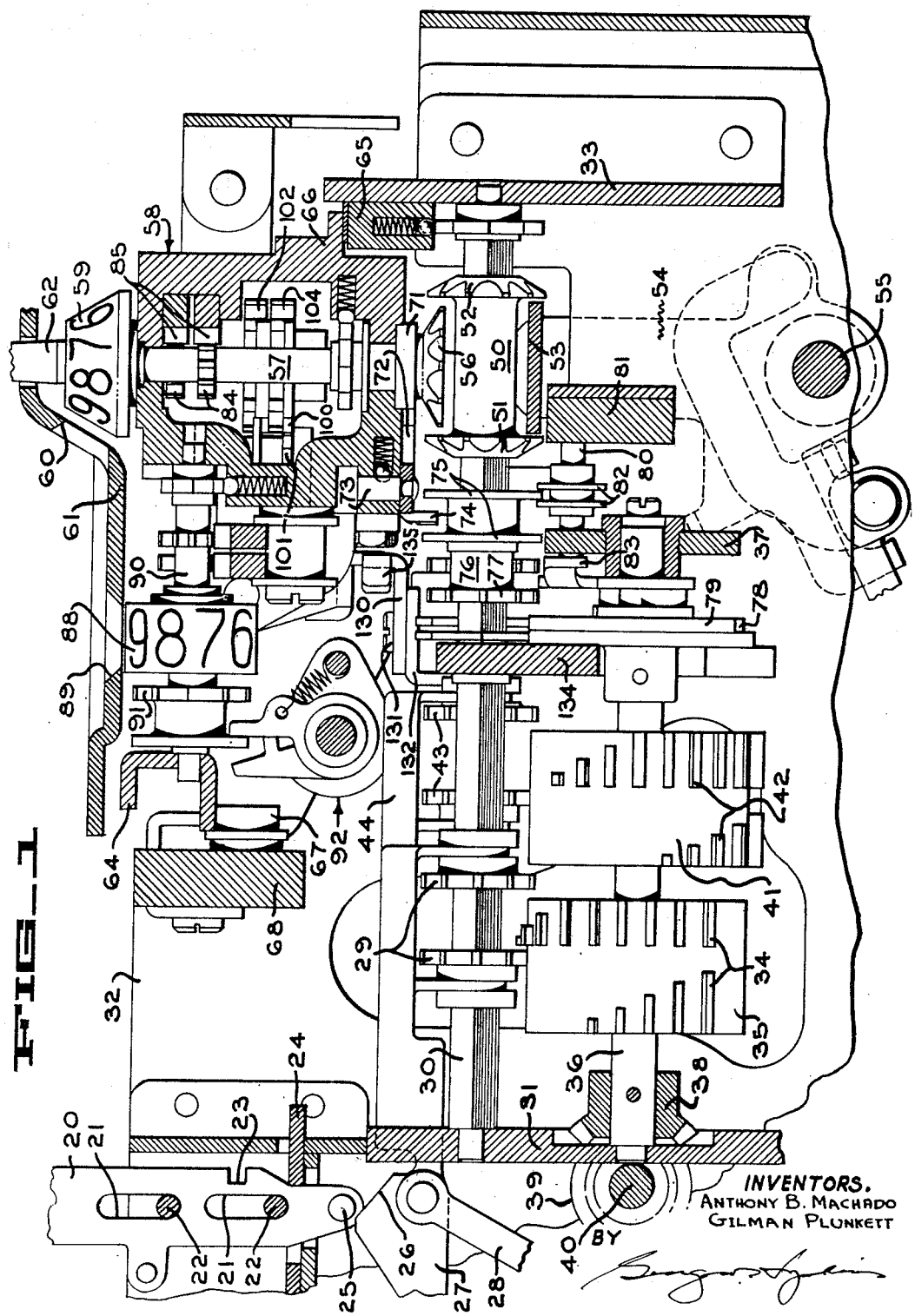
Figure 1 is a fragmentary, longitudinal, sectional view showing the selection, actuating and transfer mechanisms of a well-known type of calculating machine.

In the accompanying drawings are shown two versions of the auxiliary transfer mechanism. In the first embodiment of the invention, as shown in Figures 1 to 6, inclusive, the necessary transfers are effected in the outboard orders of the register by means of a transfer tooth secured to the shaft of each register wheel which effects the transfer of a unit to the next higher order wheel through a coupling gear which receives the impulse from the transfer tooth and transmits it to a wide-faced gear mounted on the shaft of the next higher order register wheel. The transfer of a unit from one order to the next may, in this case, be disabled by shifting the coupling gear along its axis so as to move it out of the plane of the transfer tooth, whereupon it will no longer be capable of receiving an impulse from the transfer tooth. However, the coupling gear will remain engaged with the wide-faced gear on the higher order register wheel shaft and, hence, will always be maintained in proper angular relationship with respect to the transfer tooth with which it cooperates.

In the second embodiment of the invention, which is shown in Figures 7 and 8 of the drawings, this arrangement is reversed, i. e., each register wheel shaft is provided with a narrow-faced gear which meshes with a wide-faced gear mounted for rotating and sliding movement in the register wheel carriage frame. The wide-faced gear has secured thereto a transfer tooth which lies in the plane of the narrow-faced gear mounted on the shaft of the register wheel in the next higher order. In this case, transfers from one order of the register to the next may be interrupted by sliding the wide-faced gear and its associated transfer tooth in an axial direction so as to move the transfer tooth out of the plane of the narrow-faced gear mounted on the shaft of the next higher order register wheel. In this modification of the invention, the narrow-faced gear corresponds to the coupling gear mention above in connection with the first embodiment of the invention and serves to couple one order of the register with the next higher order thereof for the transfer of the carry unit. In the second embodiment, as in the first, the wide-faced gear and the coupling gear remain in mesh at all times so as to preserve the angular relationship of the transfer tooth with respect to the coupling gear during such times as the auxiliary transfer mechanism is disabled.

In the accompanying drawings, the invention is shown as applied to a calculating machine of the type disclosed in Patent No. 2,229,889, issued to Carl M. F. Friden on January 28, 1941. In this machine, amounts to be entered into the register wheels are first set up on a keyboard including a plurality of amount keys 20 (Figure 1) which are mounted for substantially vertical sliding movement in the framework of the machine by means of a pair of elongated slots 21 formed in each key stem, through which pass a pair of through-rods 22 which are supported at either end in the framework of the machine. Each key stem 20 is provided with a notch 23 which cooperates with a latching slide 24 which enters the notch 23 when the key is depressed so as to retain the key depressed against the urgency of a suitable return spring (not shown). Each key stem is provided at its lower end with a stud 25 which lies over an inclined face 26 provided on a selector bar 27 which is mounted for endwise shifting movement in the machine by means of a pair of pivoted links 28 (only one shown). Two selector bars 27 are provided for each row of amount keys, one bar being provided with inclined faces 26 arranged to lie beneath the studs 25 on the "1" to "5" keys, while the other bar 27 is provided with inclined faces 26 lying beneath the studs 25 on the "6" to "9" keys. By varying the angle of inclination of the inclined faces 26, the selector bars 27 may be caused to move forward by differential amounts whenever a key 20 in that particular bank of keys is depressed. At its rear end, each selector bar is operatively connected with a selector gear 29 slideably, but non-rotatably, mounted on a square shaft 30 which is journalled at its forward end in a cross bar 31 extending between the right side frame (not shown) and the left side frame 32 of the machine. At its rear end, the shaft is journalled in a cross bar 33 which, like the bar 31, is supported between the side frames of the machine. Each selector gear 29 is provided with ten teeth and is arranged to cooperate with a series of differentially stepped teeth 34 provided on an actuator drum 35 mounted on an actuator shaft 36 journalled between the cross bar 31 and a cross bar 37 secured to the framework of the machine. Mounted on the forward end of the shaft 36 is a bevel gear 38 which meshes with a similar bevel gear 39 secured to a transverse power shaft 40 journalled between the side frames of the machine.

As fully shown and described in the above-mentioned Patent No. 2,229,889, the calculating machine is provided with an electric motor which is arranged to drive the shaft 40 in a cyclic manner by means of a suitable clutch mechanism. Hence, the actuator shafts 36 will be given cycles of operation and will thereby cause the square shaft 30 to be rotated by the actuator drum 35 through one to nine steps of movement in accordance with the value of the key depressed.

Immediately behind the drum 35 on the shaft 36 is a second actuator drum 41 which, like the drum 35, is provided with a series of differentially stepped teeth 42 which are arranged to cooperate with a second pair of selector gears 43 which are settable from a second row of keys by means of selector bars 44 in a manner similar to that employed in connection with the gears 29. Hence, for each row of keys provided in the keyboard of the machine, there is provided a pair of selector bars, two selector gears, a square shaft 30 and one actuator drum for operating the selector gears. Inasmuch as two actuator drums are provided on each actuator shaft 36, there need be only half as many actuator shafts as there are banks of keys.

Slideably, but non-rotatably, mounted on the rear end of each square shaft 30 is a spool 50 on the forward end of which is mounted a ten-toothed add gear 51 and on the rear end of which is mounted a ten-toothed subtract gear 52. Lying in the space between the gears 51 and 52 is a tranverse bail, or gate, 53 which extends across the machine and is supported at either end by arms 54 (only one shown) which are secured to a gate shaft 55 which is journalled between the side frames of the machine. As described in Patent No. 2,229,889, the gate shaft 55 may be rocked either clockwise or counterclockwise so as to cause either the add gear 51 or the subtract gear 52 to be moved into mesh with a ten-toothed gear 56 which is mounted on the lower end of a register wheel shaft 57 which is journalled in suitable bearings provided in a carriage frame bar 58. On the upper end of each shaft 57 is a numeral wheel 59 which is viewable through an aperture 60 provided in a carriage cover 61. Each numeral wheel 59 is provided with a twirler knob 62 which extends through a suitable aperture provided in the cover 61 so as to enable the register wheel to be manually rotated to any desired position.

On either end of the carriage frame bar 58 is secured a carriage end frame 63 (Figure 3) (only one shown), which end frames are connected together at their forward ends by means of a guide rail 64. The frame bar 58, end frames 63 and guide rail 64 comprise the main framework of the shiftable register carriage which is arranged for endwise shifting movement on the machine frame. For this purpose, the cross bar 33 (Figure 1) has secured thereto a bearing rail 65 which lies beneath a lip 66 formed on the frame bar 58 and in this manner serves as a guide and a support for the rear end of the shiftable carriage. The guide rail 64 which extends across the front of the carriage is supported on and guided by a plurality of guide rolls 67 which are rotatably journalled on a cross bar 68 which is fastened at either end to the side frames of the machine. Hence, the carriage and the register wheels may be shifted relative to the spools 50 so as to change the ordinal relationship between the register wheels and the various orders of the actuating mechanism mounted in the framework of the machine. When the gate 53 is in its neutral position, as shown in Figure 1, ordinal shifting movements of the carriage may be effected without interference on the part of the add-subtract gears 51 and 52, since in this position of the gate, the gears 56 on the lower ends of the register wheel shafts 57 or free to move through the space existing between the add-subtract gears.

Means may be provided, as shown and described in U. S. Patent No. 2,294,083, issued to Carl M. F. Friden on August 25, 1942, for shifting the carriage in either direction from one ordinal position to another by power driven means controlled either by a pair of manually operable shift keys or by certain function control mechanisms which are customarily provided in machines of this character.

Secured to each shaft 57, just above the gear 56, is a transfer cam 71 which cooperates with a transfer lever 72. This lever is pivotally mounted in the frame bar 58 by means of a stud 73 which is secured to the transfer lever and is journalled in a bore provided in the frame bar. Each transfer lever 72 is provided with a formed-over ear 74 which lies between a pair of flanges 75 formed on a hub 76 of a transfer gear 77 which is slideably, but non-rotatably, mounted on the square shaft 30 in the next higher order. The transfer gears 77 are each provided with ten teeth and are each adapted to cooperate with a single tooth 78 formed on a series of transfer actuators 79 mounted on the actuator shafts 36. The transfer gears are yieldably maintained in either their rearward, or inactive positions or in their forward, or active positions by means of detent pins 80 which are slideably mounted in the cross bar 37 and in an auxiliary frame bar 81. Each pine 80 is provided with a pair of flanges 82 which embrace a flange on its associated transfer gear so as to cause the pin 80 to partake of the sliding movements of the transfer gear. The pins 80 are suitably detented in either their forward or rearward positions by means of spring pressed balls (not shown) mounted in the cross bar 81 which are adapted to engage with notches formed in the rear ends of pins 80.

It will be seen from the foregoing description that each time a numeral wheel passes from "9" to "0" or from "0" to "9," the cam 71 will oscillate its associated transfer lever 72 and cause the transfer gear 77 in the next higher order to be moved into the path of the actuator tooth 78 for that order. The gear 77 will be maintained in its forward position by detent pin 80 until after the gear has been rotated one tooth space by the tooth 78, after which the gear will be returned to its rearward, or inactive position by means of a restore cam 83 mounted on the actuator shaft 36. The mechanism just described, consisting of the transfer cams 71, transfer levers 72, transfer gears 77 and transfer actuator teeth 78 comprises what will hereinafter be referred to as the conventional, or main, transfer mechanism of the machine Machines of the type presently being described are generally provided with six actuator shafts 36 and twelve square shafts 30 so that the twelfth numeral wheel 59 from the right-hand end of the register is normally the highest order wheel to receive a transfer impulse from the main transfer mechanism when the carriage is in its leftmost, or normal position. Hence, inasmuch as the main transfer mechanism is mounted within the framework of the machine and is contained in the space existing between the right and left side frames of the machine, the first twelve orders of the register may be considered to be the inboard orders thereof when the register carriage is in its leftmost, or normal position, whereas all higher orders of the register may be considered to constitute the outboard orders of the register.

Means is provided for simultaneously resetting all of the numeral wheels 59 to their zero positions and for this purpose each shaft 57 is provided with a mutilated gear 84 which is adapted to cooperate with a resetting rack 85 mounted for longitudinal sliding movement within the frame bar 58. This resetting mechanism is of conventional design and may be similar to that shown and described in Patent No. 2,294,083, supra. As therein described, this mechanism may be either manually operated by means of a resetting knob located at the right-hand end of the carriage or may be operated by power derived from one of the actuator shafts 36.

For the purpose of registering the number of cycles performed by the machine with the carriage located in any of its various ordinal positions, the shiftable carriage has mounted thereon a plurality of numeral wheels 88 which are viewable through a window 89 provided in the cover 61 of the carriage. Each numeral wheel 88 is mounted on a horizontal shaft 90 which is journalled at its rear end in the frame bar 58 and at its forward end in the guide rail 64. Also mounted on each shaft 90 is an actuator gear 91 which is adapted to be operated by a revolutions counter actuator 92 which is journalled in the framework of the machine and serves to rotate the numeral wheel 88, located in cooperative relationship with the lowest order of the actuator 92, one step on each cycle of operation of the machine and also serves to perform the necessary transferring operations in the higher order wheels 88. This mechanism is of conventional design and reference may be had to Patent No. 2,229,889 for a detailed description thereof.

Auxiliary transfer mechanism

In order to extend the transferring of units from one order of the register to the next higher order thereof beyond the twelfth numeral wheel 59, the machine shown in the accompanying drawings is provided with an auxiliary transfer mechanism which enables transfers to be effected throughout the entire capacity of the register.

Figure 2:
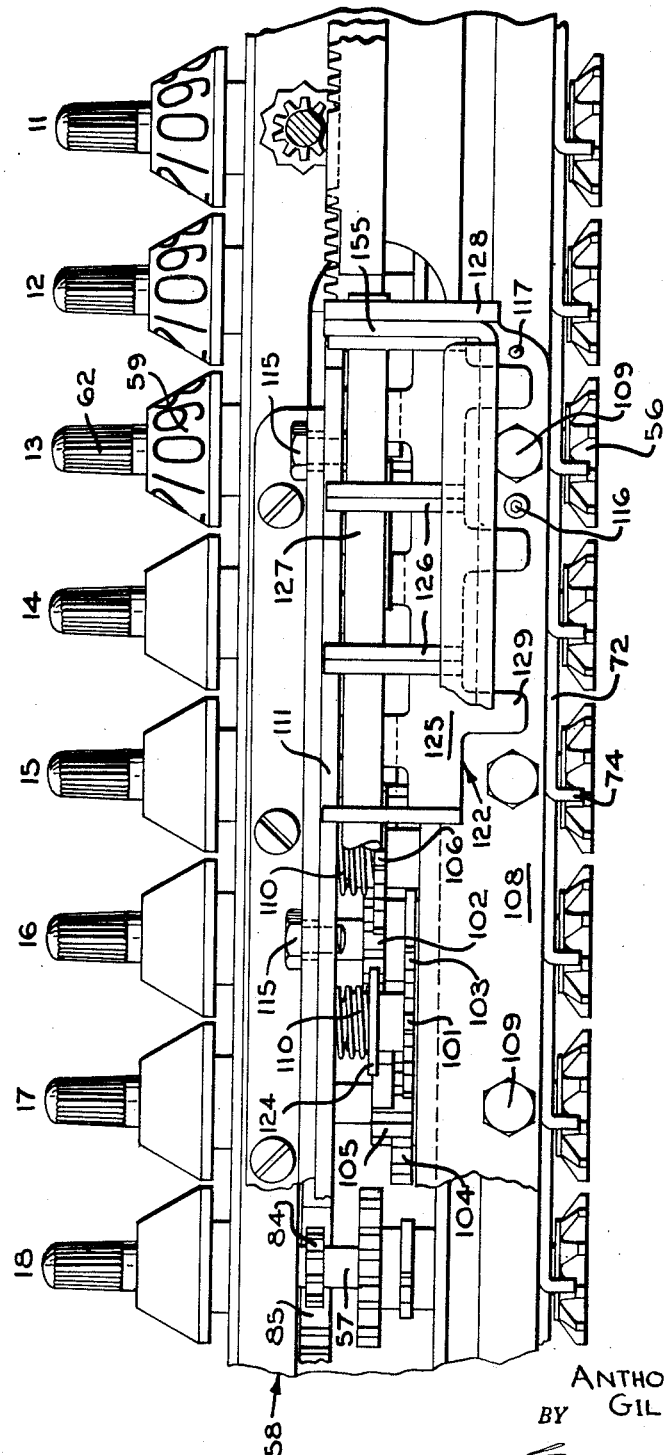
Figure 2 is a front elevation of the left-hand end of the register wheel carriage.
Figure 3:
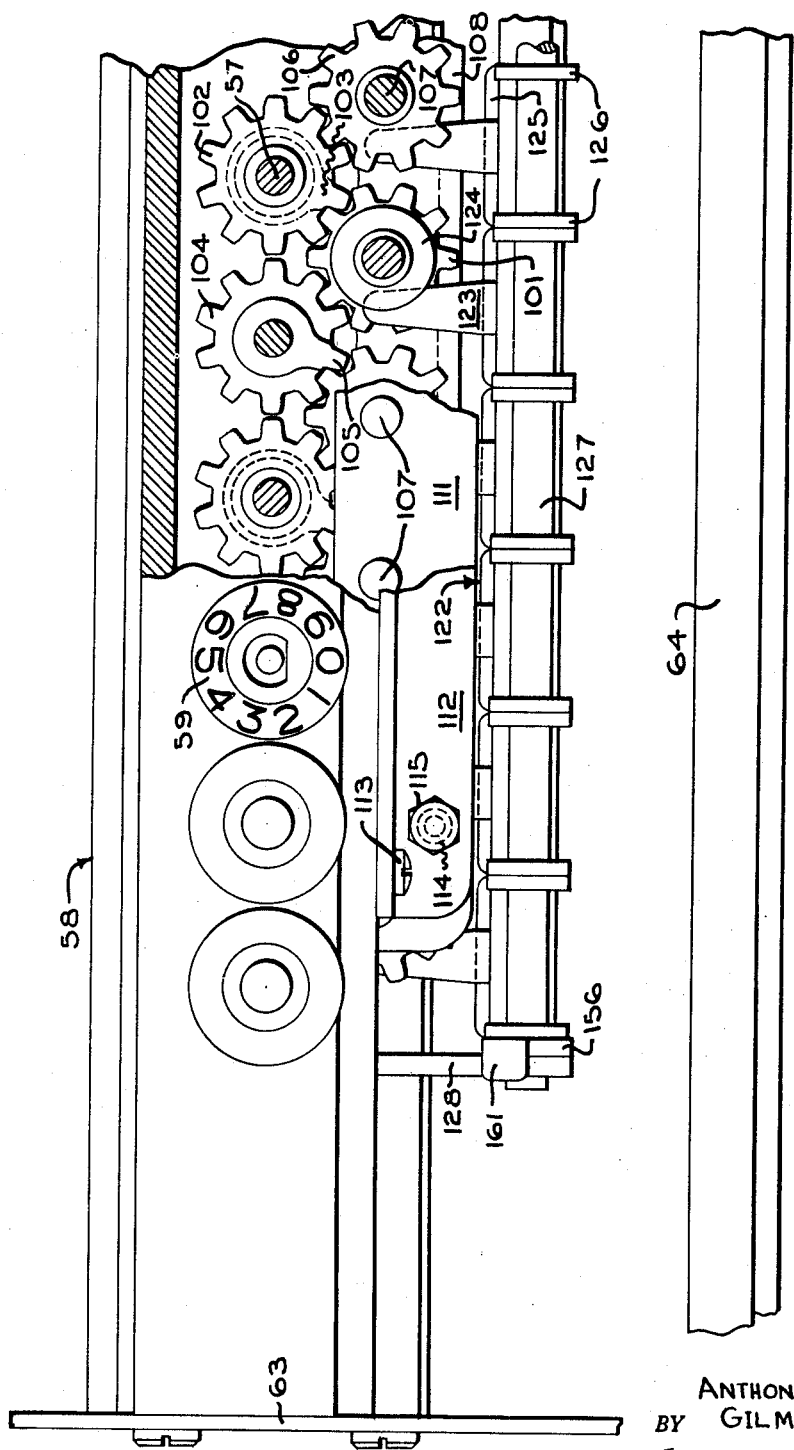
Figure 3 is a plan view of the left-hand end of the carriage with certain parts broken away so as to more clearly show the auxiliary transfer mechanism.
Figure 4:
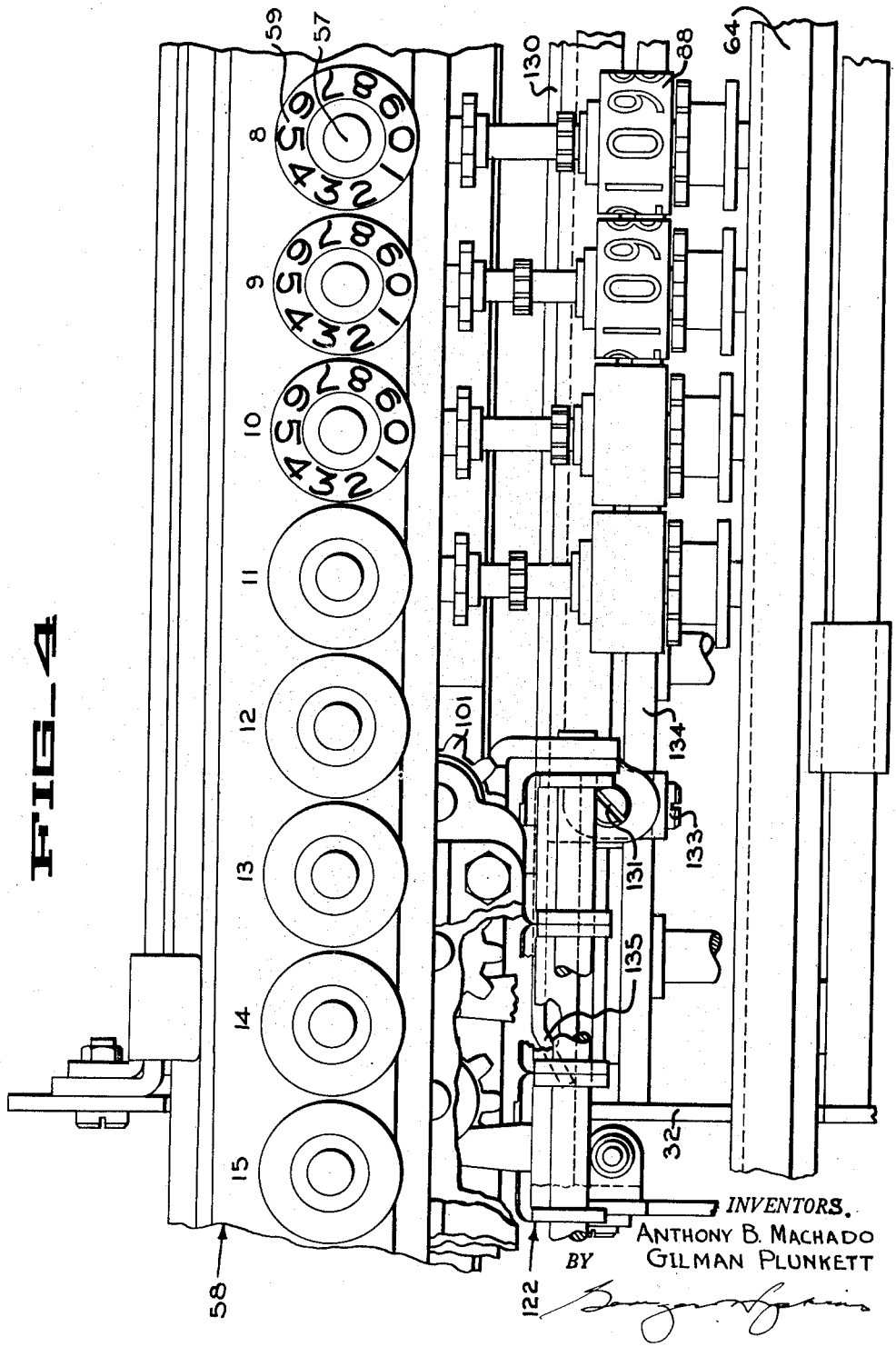
Figure 4 is a plan view of the carriage which illustrates further details of the auxiliary transfer mechanism.

As shown in Figure 1, the register wheel shaft 57 in the twelfth order of the carriage, i. e., the twelfth shaft from the right-hand end of the carriage, has secured thereto a single-toothed gear 100 which is adapted to engage with the teeth of a ten-toothed coupling gear 101 (see also Figure 4) so as to cause the latter gear to be rotated through one tooth space each time the twelfth order wheel passes from "9" to "0" or from "0" to "9." In the case of the thirteenth and all higher order register wheels, there is provided on the shaft 57 for each of these wheels a unitary transfer tooth and gear assembly for causing the transfer of a unit from one order to the next in accordance with the requirements of the calculation. As shown in Figures 2 and 3, each of the shafts 57 in the even orders of the register has secured thereto an assembly consisting of a ten-toothed gear 102 and a single transfer tooth 103 lying beneath the gear 102 and spaced a short distance therefrom, as is best illustrated in Figure 2. Similarly, in each of the odd orders of the register, such as the thirteenth, fifteenth, seventeenth, etc., orders, each dial shaft 57 has secured thereto a unitary gear and transfer tooth assembly consisting of a wide-faced gear 104 and a single transfer tooth 105 which is formed as an integral part of the gear 104, as is best shown in Figure 2.

In order to couple one order of the register to the next higher order thereof for the transfer of units in tens carrying operations, intermediate or coupling gears are located between the shafts 57, the aforementioned gear 101 constituting the coupling gear between the twelfth and thirteenth orders of the register. For the purpose of coupling the thirteenth order to the fourteenth order thereof, a coupling gear 106 is provided, this gear being similar to the gear 101 but lying somewhat above the gear 101, as is clearly shown in Figure 2 of the drawings. As herein shown, each coupling gear 106 lies in the same plane as the gears 102 on the even order register wheel shafts 57 while the coupling gears 101 are arranged to lie in the plane of the wide-faced gears 104 mounted on the register wheel shafts.

Figure 5:
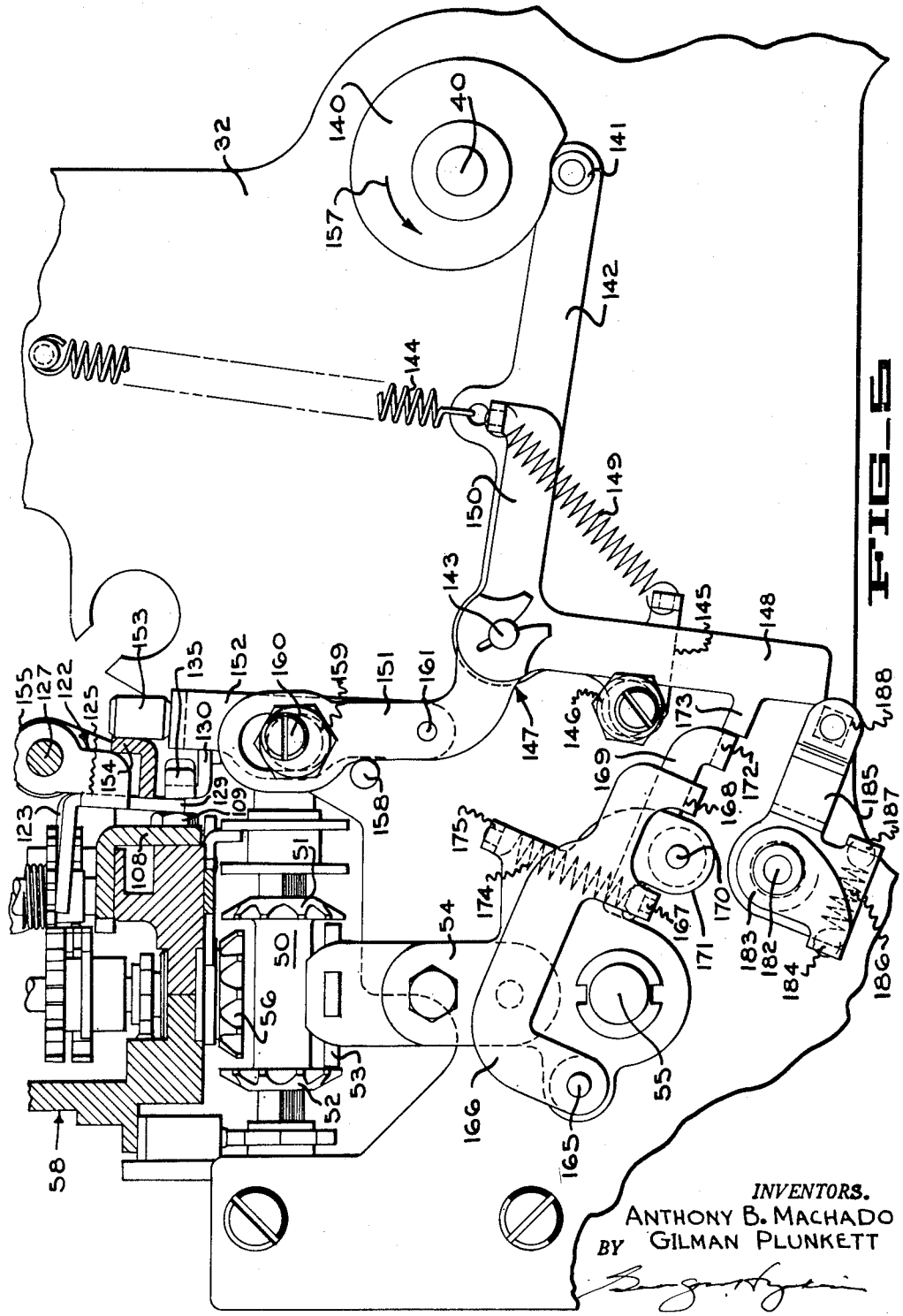
Figure 5 is a side elevation showing certain of the controlling mechanism mounted on the left side frame of the machine.

The coupling gears 101 and 106 are rotatably journalled on studs 107 which are securely fastened at their lower ends to a frame bar 108 which is of an angular cross section, as shown in Figure 5, and is secured to the carriage frame bar 58 by means of bolts 109. The coupling gears are arranged for sliding movement in an axial direction on the studs 107 but are normally maintained in their lower positions (as shown in Figure 2) by means of compression springs 110 which encircle the studs 107 and are maintained in a state of compression by means of a carriage frame plate 111 which also serves as a support for the upper ends of the studs 107. The plate 111 is in turn secured to an angle bracket 112 which is secured to the forward face of the carriage frame bar 58 by means of screws 113. The bracket 112 is provided with a plurality of apertures 114 through which pass bolts 115 which are screwed into threaded holes provided in the plate 111. As shown in Figures 2 and 3, the apertures 114 are of somewhat larger diameter than the bolts 115 so as to permit the coupling gear frame assembly, comprising the bar 108, studs 107 and plate 111, to be adjusted on the carriage frame bar 58.

Inasmuch as the continuously geared type of auxiliary transfer mechanism which is herein utilized must be very accurately manufactured and very carefully adjusted in order to insure the complete carry-over of a unit from the twelfth order of the register to the highest order thereof, means is provided for adjusting the coupling gear framework as a unit so as to enable the coupling gears to be accurately adjusted with respect to the gears 102, 104 and transfer teeth 103, 105. For this purpose, a pair of set screws 116 (only one shown) is provided at either end of the frame bar 108, the set screws being threaded into suitably threaded holes provided in the bar 108. In the assembly of the auxiliary transfer mechanism, the bar 108 is fastened to the carriage frame bar 58 by means of the bolts 109, the endwise location of the bar 108 being accurately defined by means of a pair of dowel pins 117 mounted in the carriage frame bar 58 of the carriage which pass through holes provided therefor in the bar 108. The bar 108 may, however, be accurately adjusted either toward or away from the carriage frame bar 58 by means of set screws 116, thereby enabling the studs 107 to be adjusted toward or away from the register wheel shafts 57 so as to insure that the coupling gears will be accurately positioned with respect to the gears 102, 104 and the transfer teeth 103, 105. During this adjustment of the framework which supports the coupling gears, the bolts 115 are left loose so that the plate 111 which supports the upper ends of the studs 107 will be free to move back and forth with the bar 108 as the latter is being adjusted by means of set screws 116. After proper adjustment of the bar 108 has been effected, the bolts 109 are tightened down as are also the bolts 115 so as to positively maintain the studs 107 in their accurately located positions.

Disabling of individual orders of the auxiliary transfer mechanism

As mentioned in the preceding section, the coupling gears 101 and 106 may be slid axially along the studs 107 against the force of the springs 110 so as to move the gears out of cooperative relationship with respect to their associated transfer teeth 103, 105, whereupon the connection from one order of the register to the next for the purpose of effecting tens-transfers will be disabled. However, inasmuch as the gears 102, 104 on the shafts 57 are of approximately twice the width of the coupling gears, the latter gears will always be maintained in mesh with the gears 102, 104 so as to, at all times, preserve the proper angular relationship between the coupling gears and their associated transfer teeth.

For the purpose of shifting the coupling gears on the studs 107 so as to disable the operation of the auxiliary transfer mechanism between individual orders of the register, each coupling gear has associated therewith a shifting lever 122 which, when rotated, will cause its associated coupling gear to be elevated out of the plane of its related transfer tooth. As shown in Figures 3 and 5, each lever 122 is provided with a shifter arm 123 which extends toward the rear of the carriage where it lies beneath the lower face of the coupling gear in the case of the gears 106, or, in the case of the gears 101, beneath a flange 124 formed integrally with the coupling gear. The arms 123 are formed on bails 125 which are provided with formed-over ears 126 which are apertured to receive a shaft 127 supported at either end by means of flanges 128 (see Figures 2 and 3) formed on either end of the bar 108. Each bail 125 is also provided with a downwardly extending tab 129 which lies in the plane of a rail 130 (see Figures 1, 4 and 5) which is secured by means of screws 131 to a bracket 132 which in turn is secured by screws 133 to a transverse frame bar 134 supported between the side frames of the machine. The rail 130 is provided at either end with an angular lip 135, the lip on the left-hand end of the rail being adapted to engage the tabs 129 as the carriage shifts toward the right, as viewed from the front of the machine, thereby rocking the bails 125 clockwise, as viewed in Figure 5. The shifter arms 123 are thereby raised so as to cause the coupling gears associated therewith to be moved out of the plane of their related transfer teeth 103, 105. The lip 135 is so located with respect to the tabs 129 as to disable the auxiliary transfer mechanism for each order of the register as that order moves inboard of the machine. In other words, when the carriage is in its extreme left-hand position, the tabs 129 all lie to the left of the rail 130 and, hence, the auxiliary transfer mechanism is effective in all of the outboard orders of the register. However, when the carriage is shifted one ordinal position to the right, the rightmost tab 129 (see Figure 2) will be cammed in by the lip 135, thereby causing the coupling gear 101 between the twelfth and thirteenth orders of the register to be elevated so as to disable the auxiliary transfer mechanism between these orders. This mechanism will be maintained effective in all higher orders, i. e., in all orders of the register which lie outboard of the machine frame so as to enable the required transfers to be effected between the outboard orders of the register. In a like manner, when the carriage is shifted another step to the right, the second tab 129 will be cammed inward by the lip 135 so as to disable the auxiliary transfer mechanism between the thirteenth and fourteenth order wheels, inasmuch as transfers between these two orders can now be effected by the main transfer mechanism of the machine. If the carriage is now shifted toward the left, the tabs 129 will move off of the rail 130 and, hence, enable the auxiliary transfer mechanism, order by order, so as to re-establish the transfer connection between adjacent orders of the register as they move outboard of the machine.

This disabling of the auxiliary transfer mechanism between adjacent orders of the register as the wheels thereof move inboard is necessary inasmuch as the main transfer mechanism of the machine will become effective to cause transfers to take place between the register wheels as they move inboard of the machine. Since the auxiliary transfer mechanism is of the simultaneous type whereas the main transfer mechanism is of the delayed or successive type, if the auxiliary transfer mechanism were not disabled, both mechanisms would be attempting to operate the same register wheel at different times in the machine cycle and a malfunction of the machine would occur.

*Disabling of auxiliary transfer mechanism in full cycle position of machine*

It is also desirable to cause the auxiliary transfer mechanism to be disabled in its entirety when the machine is in its full cycle position in order that the numeral wheels 59 may be rotated by the twirler knobs 62 without interference on the part of this mechanism. Furthermore, the operator may desire to reset the register wheels by means of the hand clearance mechanism which may be of the type shown in Patent No. 2,294,083, supra. If the auxiliary transfer mechanism were not disabled and the operator should attempt to reset the register wheels to zero by means of the resetting knobs located on the right-hand end of the carriage, the transfer teeth 103, 105 on the wheels first to reach their zero positions during the resetting operation would be picked up by the coupling gears 101, 106 being rotated by those wheels still in the process of being reset, thereby causing their associated register wheels to be rotated through the transfer point from "0" to "9."

As shown in Figure 5 of the drawings, the transverse power shaft 40 is provided at the left-hand side of the machine with a cam 140 which cooperates with a roll 141 mounted on the forward end of an arm 142 which is journalled on a stud 143 secured to the left side frame 32. The roll 141 is maintained in contact with the periphery of the cam 140 by means of a tension spring 144. Integral with the arm 142 is a second arm 145 which carries an adjustable abutment element 146 which serves as a limit stop for a three-armed lever 147 which is journalled on the stud 143 alongside of the arm 142. The lever 147 is provided with a downwardly extending arm 148 which is maintained in contact with the element 146 by means of a spring 149 which is tensioned between an ear formed on the arm 145 and an ear formed on a forwardly extending arm 150 of the lever 147. The lever 147 is also provided with an upwardly directed arm 151 on which is adjustably mounted an extension 152 which carries a roll 153 lying in front of a bail 154 which is pivotally mounted on the shaft 127 by means of side arms 155 (see also Figure 2) and 156 (Figure 3), the latter arm being provided with a formed-over ear 161 which contacts the flange 128 and thereby limits the forward movement of the bail 154 when the roll 153 is removed therefrom. The rearward edge of the bail 154 lies in front of the tabs 129 and, when the machine is in its full cycle position, as shown in Figure 5, serves to maintain all of the tabs in their rearward positions, thereby causing the coupling gears to be held in their raised positions so as to lie out of cooperative relationship with respect to transfer teeth 103, 105. Hence, when the machine is in its full cycle position, the auxiliary transfer mechanism will be completely disabled and the numeral wheels may be freely rotated by means of the twirler knobs and may likewise be reset to zero by the manual clearance mechanism without any interference on the part of the auxiliary transfer mechanism.

However, when the machine is cycled, the power shaft 40 will rotate in the direction of the arrow 157, thereby rocking the arm 142 clockwise against the tension of the spring 144 so as to permit the spring 149 to move the roll 153 away from the bail 154 and allow the springs 110 associated with the individual coupling gears to lower these gears into their effective positions. Hence, on each cycle of the machine, the auxiliary transfer mechanism will be rendered effective during the last part of the cycle when the main transfer mechanism operates to effect a carry into the twelfth order register wheel. Hence, the auxiliary transfer mechanism will be in readiness to extend the carry throughout the entire capacity of the register at this time but will again be rendered ineffective as soon as the machine reaches its full cycle position, at which time the roll 141 will be permitted to drop off of the high portion of the cam 140 and the spring 144 will be effective to move the bail 154 rearwardly. When the machine is at rest in its full cycle position, the three-armed lever 147 will be held in its counterclockwise position by the spring 144, this position being defined by a stud 158 mounted in the left side frame 132. The position of the roll 153 may be adjusted either toward or away from the bail 154 by means of an eccentric 159 mounted on the extension 152 which may be rotated to the desired position and then clamped by a screw 160. This will cause the extension 152 to be oscillated about a stud 161 thereon until the proper setting is obtained, after which the eccentric may be locked in its adjusted position by tightening the screw 160.

*Disabling of auxiliary transfer mechanism when gate is in neutral*

Means is provided for disabling the auxiliary transfer mechanism in its entirety whenever the add-subtract gate 53 is positioned in its central, or neutral, position during a cycle of operation of the machine. The gate is maintained in this position during shifting of the carriage and also during power resetting operations and, in either case, it would of course be unnecessary or undesirable to have the auxiliary transfer mechanism rendered effective.

As shown in Figure 5, the left-hand gate supporting arm 54 carries a stud 165 on which is pivoted a centralizing arm 166 which is provided with a pair of formed-over ears 167 and 168 which bear against the lower edge of a blocking arm 169. The arm 169 is pivoted at 170 on an extension 171 of the arm 54 and is provided with a blocking ear 172 which normally lies in front of an abutment finger 173 formed on the arm 148. The blocking arm 169 is yieldably maintained in the position shown in Figure 5 by means of a spring 174 which is tensioned between an ear 175 formed on the arm 54 and the ear 167 on the centralizer arm 166. Hence, while the blocking arm 169 may rotate about its pivot 170, in so doing it will tension the spring 174 which will always tend to maintain both ears 167 and 168 in contact with the lower edge of the member 169.

During shift cycles, when the gate is maintained in its neutral position, or during power resetting operations when it is likewise maintained in its neutral position, the ear 172 will lie behind the finger 173 and thereby prevent rotation of the lever 147 under the influence of the spring 149 as the cam 140 rotates, whereby the auxiliary transfer mechanism will remain disabled throughout the entire machine cycle. However, in the case of adding, subtracting, or multiplying operations, the gate 53 will be shifted to either the add or subtract position at the very outset of the machine cycle, thereby removing the ear 172 from behind the finger 173 so as to permit the roll 153 to be moved away from the bar 154 by the spring 149. Since the gate must be restored to its neutral position prior to the return of the lever 147 to its full cycle position (as shown in Figure 5) at the very end of the machine cycle, the blocking member 169 must be made yieldable in the manner previously described herein so as to permit the gate to be restored to neutral without interference on the part of the finger 173. Hence, although this finger will lie in a position above or beneath the ear 172 at the time when the gate is centralized, the spring 174 will permit the member 169 to yield and thereby permit centralization of the gate without interference on the part of the finger 173.

*Disabling of auxiliary transfer mechanism during division operations*

Inasmuch as the full carry-over mechanism is not required while performing problems in division, since in this case the carriage is always shifted sufficiently far to the right to bring all orders of the register containing significant digits within the range of the actuating mechanism of the machine, means has been provided for disabling the auxiliary transfer mechanism during division operations so as to prevent the needless wear and tear on this mechanism which would otherwise occur.

Figure 6:
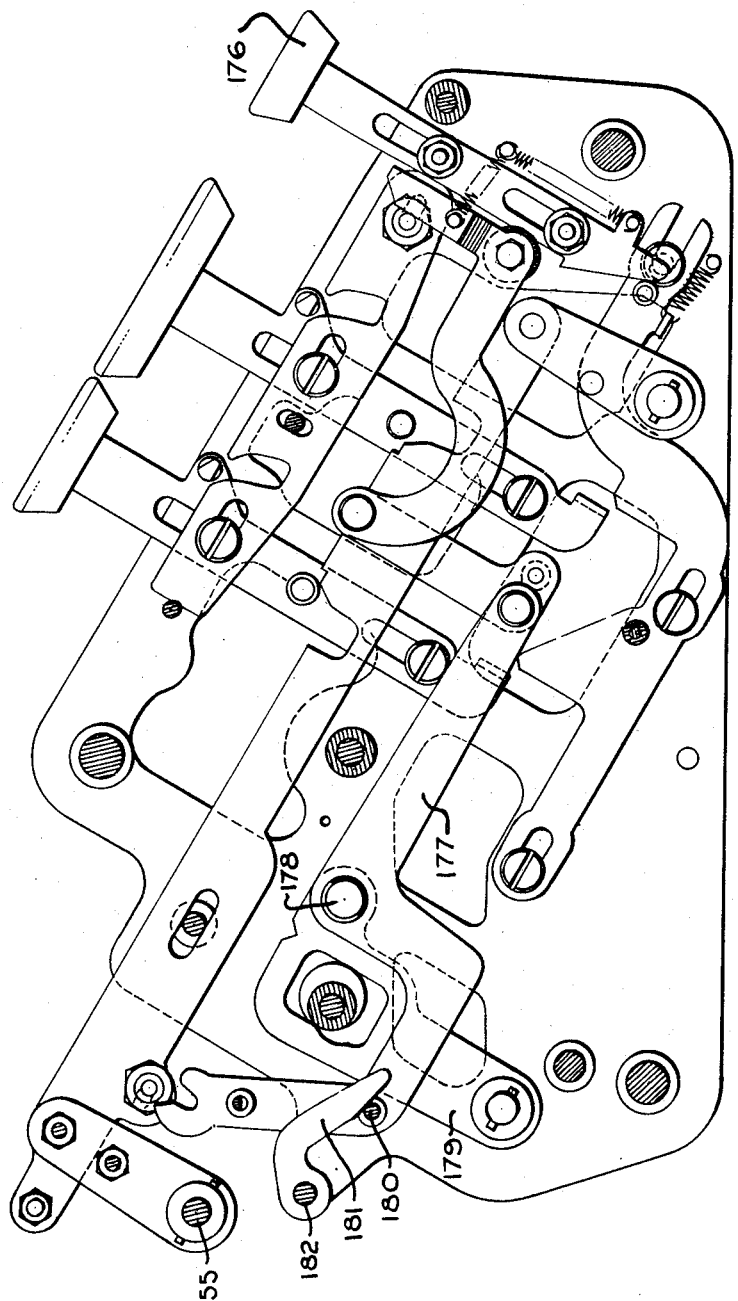
Figure 6 is a side elevation showing certain of the mechanism mounted on the control plate of the machine.

Referring to Figure 6 of the drawings, the present machine is provided with the well-known division key 176 which, when depressed, causes a connecting lever 177 pivoted at 178 on an arm 179 to be rocked clockwise in a well-known manner. For a complete and detailed description of this mechanism, reference is made to Patent No. 2,366,345, issued to Anthony B. Machado on January 2, 1945. Clockwise movement of the lever 177 causes a stud 180 therein to lift the forward end of an arm 181 which is secured to a division control shaft 182. As shown in Figure 5, this shaft is provided at its left-hand end with an arm 183 which is provided with a formed-over ear 184. This ear is held in contact with the rear edge of an arm 185 by means of a light spring 186 stretched between the ear 184 and an ear 187 provided on the arm 185. The arm 185 is provided with a square stud 188 which is adapted to cooperate with a lower end of the arm 148. Hence, when a division operation is initiated by depression of the division key 176, the shaft 182 will be rocked counterclockwise, as viewed in Figures 5 and 6, thereby moving the stud 188 up behind the lower end of the arm 148. In this manner, the lever 147 will be prevented from clockwise rotation under the influence of the spring 144 during cycling of the machine and the auxiliary transfer mechanism will thereby be maintained ineffective during division operations.

Upon the termination of a division operation, the connecting lever 177 is permitted to return to its normal position, as shown in Figure 6, and the division control shaft 182 is permitted to rotate clockwise to its Figure 6 position. Inasmuch as the return of the parts 177 and 182 occurs at an earlier point in the cycle than the restoration of the arm 148 to its full cycle position, as shown in Figure 5, the previously described yieldable connection between the arms 183 and 185 is provided so that the arm 183 may move clockwise against the action of the light spring 186 but will not have the extra load imposed thereon due to the frictional engagement of the arm 148 bearing against the square stud 188. At the end of the last cycle of the division operation, the arm 148 will be returned to the position shown in Figure 5 and the pressure of this arm against the square stud will be relieved, thereby permitting the spring 186 to return the arm 185 to its normal position, as shown in Figure 5.

*Modified form of auxiliary transfer mechanism*

In Figures 7 and 8 of the drawings is shown a modification of the auxiliary transfer mechanism hereinabove described and illustrated. As shown in these figures, each register wheel shaft 57 has fastened thereto narrow-faced, ten-toothed gears 195 and 196, the gears 195 being provided on the shafts 57 of the even order register wheels while the gears 196 are provided on the shafts 57 of the register wheels located in the odd orders of the register. As shown in the drawings, each gear 195 is arranged to mesh with a wide-faced gear 197 and each gear 196 is arranged to mesh with a wide-faced gear 198. The gears 197 and 198 are journalled on studs 199 (Figure 8) which are secured at their lower ends to a frame plate 200. The upper ends of the studs 199 are received in apertures provided in a bracket 201, the plate 200 and bracket 201 being suitably secured to the carriage frame bar 58. The gears 197 and 198 are normally maintained in their lower positions, as shown in Figure 7, by means of suitable compression springs 202 so as to normally maintain a transfer tooth associated with each gear in the plane of the gears 196 and 195, respectively. As shown in Figure 7, a hub of the gear 197 has formed thereon a transfer tooth 203 which lies in the plane of the narrow-faced gear 196, while the hub of the gear 198 has formed thereon a transfer tooth 204 lying in the plane of the narrow-faced gear 195. Hence, as shown in Figure 8, when the narrow-faced gear 195 on the twelfth order register wheel rotates clockwise from "0" to "9," it will rotate its associated wide-faced gear 197 counterclockwise one tooth space, whereupon the transfer tooth 203 associated with the gear 197 will engage with the narrow-faced gear 196 in the thirteenth order and rotate this gear through one tooth space in a clockwise direction so as to move the numeral wheel 59 in the thirteenth order from "0" to "9." This operation will be continued through as many of the higher orders of the register as is necessary in order to effect the required tens-transfers.

In the modified form of the auxiliary transfer mechanism, means has been provided for disabling the transferring connection between individual orders of the register in a manner similar to that employed in connection with the form of mechanism shown in Figures 1 to 5, inclusive. For this purpose, each of the gears 197 and 198 has associated therewith a shifting lever 205 which is pivotally mounted on a shaft 206 which is supported at either end by upturned ears 207 (only one shown) formed on either end of the frame plate 200. As shown in Figure 8, the levers 205 are provided with a bifurcated portion which straddles the hub portion of each of the gears 197 and 198 and are also provided with downwardly extending tabs 208 which may cooperate with a rail similar to the rail 130 described earlier herein. In this manner, as each order of the register moves inboard of the machine, the tab 208 will be cammed rearwardly by the lip on the left-hand end of the rail so as to elevate its associated gear 197 or 198, thereby moving the transfer tooth 203 or 204 to its ineffective position. Inasmuch as the gears 197 and 198 are of considerable width, the actual shifting of these gears on the studs 199 will not result in the disengagement of the gears from their associated narrow-faced gears 196 and 195, whereby the transfer teeth 203 and 204 will be at all times maintained in correct angular relationship with respect to the narrow-faced gears.

In order to enable the entire auxiliary transfer mechanism to be disabled by the mechanism shown in Figure 5 of the drawings, a bail 209 is pivoted on the shaft 206, this bail lying in front of all of the tabs 208 on the levers 205. The bail 209 corresponds to the bail 154 shown in Figure 5 and may cooperate with the roll 153 in the same manner as the bail 154. Hence, the modified type of auxiliary transfer mechanism shown in Figures 7 and 8 may be disabled when the machine is in its full cycle position by the same mechanism as that illustrated in Figure 5 for the previously described version of the auxiliary transfer mechanism. In a similar manner, the transfer mechanism shown in Figures 7 and 8 may be maintained disabled when the gate is in its neutral position and when the machine is performing division operations as described earlier herein.

*Operation*

The previously described mechanism, illustrated in Figures 1 to 6, operates as follows:

With the register carriage in its extreme left-hand position, whenever the twelfth order register wheel rotates from "0" to "9" or from "9" to "0" by virtue of the operation of the main transfer mechanism of the machine, the single transfer tooth 100 mounted on the register wheel shaft 57 in the twelfth order of the register will engage with the teeth of the coupling gear 101 situated between the twelfth and thirteenth orders and cause this gear to be rotated one tooth space. Inasmuch as this gear is constantly in mesh with the wide-faced gear 104 which is fast on the shaft 57 of the thirteenth order register wheel, the numeral wheel in the thirteenth order will be moved from "9" to "0" or from "0" to "9" in correspondence with the movement of the twelfth order numeral wheel from "9" to "0" or from "0" to "9." This action will be continued throughout as many of the higher order register wheels as is required so that any wheel which is located at the transfer point will be rotated one step in the appropriate direction so as to cause the necessary transfer to be effected.

Upon shifting of the register carriage to the right, the coupling gears 101 and 106 will be successively elevated as the carriage shifts from order to order by virtue of the lip 135 acting on the tabs 129, thereby disabling the auxiliary transfer mechanism for each order of the register as the register wheel for that order moves inboard of the machine and comes within the range of the main transfer mechanism. In a similar manner, when the carriage is shifted to the left, the tabs 129 will successively move off of the rail 130 so as to enable the auxiliary transfer mechanism for each order of the register as the register wheel for that order moves outboard of the machine or beyond the range of the main transfer mechanism.

When the machine is at rest, i. e., in its full cycle position, the roll 153 (Figure 5) which operates under the control of the cam 140, will hold the bail 154 in its rearward position, thereby elevating all of the coupling gears 101 and 108 and hence causing the entire auxiliary transfer mechanism to be disabled.

In shifting operations and in power resetting operations, when the add-subtract gate 53 is in its neutral position, the roll 153 will be maintained in its rearward position, as shown in Figure 5, by means of the ear 172 lying behind the finger 173 so as to block clockwise movement of the three-armed lever 147 under the influence of spring 149 during cycling of the machine.

The auxiliary transfer mechanism will also be maintained ineffective during division operations by virtue of the counterclockwise rotation of the division control shaft 182 which will cause the square stud 188 to be moved up behind the lower end of arm 148, thereby maintaining the roll 153 in its rearward position throughout the entire division operation.

The operation of the modified form of auxiliary transfer mechanism shown in Figures 7 and 8 is identical with that of the mechanism shown in Figures 1 to 5, the only difference being that in the second modification the narrow-faced gears are mounted on the register wheel shafts while the wide-faced gears and their associated transfer teeth are mounted on the studs 199. In this case, the wide-faced gears and transfer teeth are the shiftable elements of the transfer mechanism while the narrow-faced gears remain stationary on the register wheel shafts 57. In all other respects the modified form of auxiliary transfer mechanism shown in Figures 7 and 8 operates in the same manner as the first-described type of mechanism and is controlled by the mechanism shown in Figure 5 in exactly the same manner as the mechanism of the first modification.

We claim:

1. In a calculating machine having a frame, a carriage mounted for endwise shifting movement on said frame, and a plurality of ordinally arranged register wheels journalled in said carriage, certain of said wheels lying inboard of said frame and others of said wheels lying outboard thereof when said carriage is in its end position, the combination of a main transfer mechanism situated within said frame for effecting transfers in the inboard register wheels; an auxiliary transfer mechanism mounted on said carriage for effecting transfers in the outboard register wheels, said last-named mechanism comprising a transfer tooth connected for movement with the highest order inboard wheel, a transfer gear and a transfer tooth connected for movement with each of the outboard register wheels, a series of coupling gears for operatively connecting each transfer tooth with the transfer gear in the next higher order of the register so as to enable the transfer of a unit from one order to the next to be effected throughout the entire array of register wheels, and means mounting said coupling gears for rotation and for shifting respectively in a direction parallel to their axes of rotation from positions in which they are operative to connect the respectively associated transfer teeth and transfer gears to other positions in which they are inoperative for effecting such connection; and means operable when the carriage is moved from its end position for preventing operation of one of said transfer mechanisms with respect to register wheels moved inboard of said frame by such movement of the carriage.

2. A calculating machine structure as defined in claim 1 which includes means for adjusting within close limits the positions of said transfer gears and transfer teeth relative to said series of coupling gears.

3. In a calculating machine having a frame, a carriage mounted for endwise shifting movement on said frame, a plurality of ordinally arranged register wheel shafts journalled in said carriage and a register wheel mounted on each of said shafts, certain of said wheels lying inboard of said frame and others of said wheels lying outboard thereof when the carriage is in its end position, the combination of a main transfer mechanism situated within said frame for effecting the necessary transfers in the inboard register wheels; an auxiliary transfer mechanism for effecting the necessary transfers in the outboard register wheels, said last-named mechanism comprising a transfer tooth mounted on the shaft of the highest order inboard wheel, a transfer gear and a transfer tooth mounted on the shaft of each of the outboard wheels, a series of coupling gears for operatively connecting each transfer tooth with the transfer gear in the next higher order so as to enable a unit to be transferred from one order of the register to the next throughout the entire array of register wheels, and means journalling said coupling gears on said carriage for shifting in a direction parallel to their axes of rotation from the positions in which they are operative to connect the respectively associated transfer teeth and transfer gears to other positions in which they are inoperative for effecting such connection; and means operable when the carriage is moved from its end position for shifting to said other positions the coupling gears associated with register wheels moved inboard of said frame by such movement of the carriage.

4. A calculating machine structure as defined in claim 3 which includes means for accurately adjusting the positions of said coupling gears with respect to said transfer gears and transfer teeth.

5. A calculating machine structure as defined in claim 3 which includes a carriage frame in which said register wheel shafts are journalled, a sub-frame on which said coupling gear journalling means are carried, and means for adjustably mounting said sub-frame on the carriage frame so as to enable the location of said coupling gears to be adjusted with respect to the location of said transfer gears and transfer teeth.

6. In a calculating machine having a frame, a carriage mounted for endwise shifting movement on said frame, a plurality of ordinally arranged register wheels in said carriage, certain of said wheels lying inboard of said frame and others of said wheels lying outboard thereof when said carriage is in its end position, and a register wheel shaft for each of said wheels, the combination of a main transfer mechanism situated within said frame for effecting the necessary transfers in the inboard register wheels; an auxiliary transfer mechanism for effecting the necessary transfers in the outboard register wheels, said last-named mechanism including a transfer tooth on the shaft of the highest order inboard wheel, a transfer gear and a transfer tooth on the shaft of each of the outboard register wheels, the location of said gears and said teeth on said shafts being alternated from one order to the next so that each transfer tooth lies in the plane of the transfer gear in the next higher order, a series of coupling gears for operatively connecting each transfer tooth with the transfer gear in the next higher order so as to enable the required transfer of a unit to be effected throughout the entire array of register wheels, and means journalling said coupling gears on said carriage for shifting in a direction parallel to their axes of rotation from the positions in which they are operative to connect the respectively associated transfer teeth and transfer gears to other positions in which they are inoperative for effecting such connection; and means operable when the carirage is moved from its end position for shifting to said other positions the coupling gears associated with register wheels moved inboard of said frame by such movement of the carriage.

7. A calculating machine structure as defined in claim 6 which includes a carriage frame in which said register wheel shafts are journalled, a sub-frame on which said coupling gear journalling means are carried, and means for adjustably mounting said sub-frame on the carriage frame so as to enable all of said coupling gears to be moved as a unit either toward or away from said register wheel shafts so as to effect proper alignment of said coupling gears with respect to said transfer gears and transfer teeth.

8. In a calculating machine having a frame, a carriage mounted for endwise shifting movement on said frame, a plurality of ordinally arranged register wheels in said carriage, certain of said wheels lying inboard of said frame and others of said wheels lying outboard thereof when the carriage is in its end position, the combination of a main transfer mechanism situated within said frame for effecting transfers in the inboard register wheels; an auxiliary transfer mechanism mounted on said carriage for effecting transfers in the outboard register wheels, said last-named means including a transfer tooth connected for movement with the highest order inboard wheel, a transfer gear and transfer tooth assembly connected for movement with each of the outboard register wheels, a series of coupling gears for operatively connecting each transfer tooth with the transfer gear in the next higher order of the register so as to enable the transfer of a unit from one order to the next to be effected throughout the entire array of register wheels, means mounting said coupling gears for rotation and for shifting in a direction parallel to their axes of rotation from the positions in which they are operative to connect the respectively associated transfer teeth and transfer gears to other positions in which they are inoperative for effecting such connection, and means respective to pairs of coupling gears and transfer teeth for effecting relative axial shifting between individual coupling gears and their respectively associated transfer teeth; and means operable when the carriage is moved from its end position for operating the shifting means associated with pairs of coupling gears and transfer teeth moved inboard by such movement of the carriage.

9. A calculating machine structure as defined in claim 8 in which the transfer gears are all of sufficient thickness as to enable said transfer teeth and said series of coupling gears to be disengaged by relative axial shifting movement without disengaging the transfer gears from said series of coupling gears.

10. In a cyclically operable calculating machine having a frame, a carriage mounted for endwise shifting movement on said frame, and a plurality of ordinally arranged register wheels journalled on parallel axes in said carriage, certain of said wheels lying inboard of said frame and others of said wheels lying outboard thereof when said carriage is in its end position, the combination of a main transfer mechanism situated within said frame for effecting transfers in the inboard register wheels; an auxiliary transfer mechanism mounted on said carriage for effecting transfers in the outboard register wheels, said last-named mechanism comprising a plurality of devices mounted to rotate respectively about axes parallel to the axes of said register wheels and being slidable in a direction parallel to their axes of rotation for operatively connecting the highest order inboard wheel and each outboard order wheel with the register wheel to its left for intermittently effecting the transfer of a unit thereto, and a member cooperating with each of said devices for shifting the same in an axial direction so as to disable the transfer of a unit from each register wheel to the next higher order wheel by said auxiliary transfer mechanism; and means operable when the carriage is moved from its end position for operating those of said members cooperable with those of said devices associated with register wheels moved inboard of said frame by such movement of the carriage.

11. A calculating machine structure as defined in claim 10 wherein said member comprises a lever pivoted on said carriage.

12. A calculating machine structure as defined in claim 11 including an element mounted on said carriage and which is arranged to cooperate with all of said levers for effecting joint operation of said levers and the respectively associated connecting devices to disable the transfer of units between outboard register wheels.

13. A calculating machine structure as defined in claim 12 including a disabling mechanism supported on said frame which is arranged to cooperate with said carriage mounted element and normally maintain said devices in their shifted positions.

14. A calculating machine structure as defined in claim 13 including a cyclically operable means for rendering said disabling mechanism ineffective during each cycle of operation of the machine so as to enable said devices to effect the transfer of a unit from one register wheel to the next during a predetermined portion of each machine cycle.

15. A calculating machine structure as defined in claim 14 including an add-subtract gate, said gate having at least one registering position and also a neutral position, and means controlled by said gate for preventing said cyclically operable means from rendering said disabling means ineffective when said gate is in its neutral position.

16. In a cyclically operable calculating machine having a frame, a carriage mounted for endwise shifting movement on said frame, and a plurality of ordinally arranged register wheels journalled on parallel axes in said carriage, certain of said wheels lying inboard of said frame and others of said wheels lying outboard thereof when said carriage is in its end position, the combination of a main transfer mechanism situated within said frame for effecting transfers in the inboard register wheels; and an auxiliary transfer mechanism mounted on said carriage for effecting transfers in the outboard register wheels, said last-named mechanism comprising a plurality of devices mounted to rotate respectively about axes parallel to the axes of said register wheels and being slidable in a direction parallel to their axes of rotation for operatively connecting the highest order inboard wheel and each outboard order wheel with the register wheel to its left for intermittently effecting the transfer of a unit thereto, means for simultaneously shifting all of said devices in an axial direction so as to disable the transfer of a unit from each register wheel to the next higher order wheel by said auxiliary transfer mechanism, means cooperating with said shifting means for normally maintaining said devices in their shifted positions, and a cyclically operable means for disabling said maintaining means during a predetermined portion of the machine cycle so as to reenable the transfer of a unit from one register wheel to the next by said auxiliary transfer mechanism.

17. A calculating machine structure as defined in claim 16 including a sign determining mechanism settable to any one of a plurality of positions, and means controlled by said mechanism when set to one of said positions for preventing the disabling of said maintaining means by said cyclically operable means.

18. In a cyclically operable calculating machine having a frame, a carriage mounted for endwise shifting movement on said frame, and a plurality of ordinally arranged register wheels journalled on parallel axes in said carriage, certain of said wheels lying inboard of said frame and others of said wheels lying outboard thereof when said carriage is in its end position, the combination of a main transfer mechaism situated within said frame for effecting transfers in the inboard register wheels; and an auxiliary transfer mechanism mounted on said carriage for effecting transfers in the outboard register wheels, said last-named mechanism comprising a plurality of devices mounted to rotate respectively about axes parallel to the axes of said register wheels and being slidable in a direction parallel to their axes of rotation for operatively connecting the highest order inboard wheel and each outboard order wheel with the register wheel to its left for intermittently effecting the transfer of a unit thereto, means for simultaneously shifting all of said devices in an axial direction so as to disable the transfer of a unit from each register wheel to the next higher order wheel by said auxiliary transfer mechanism, means cooperating with said shifting means for normally maintaining said devices in their shifted positions, a cyclically operable means for disabling said maintaining means during a predetermined portion of the machine cycle, a division control mechanism, and means controlled by said division control mechanism for preventing the disabling of said maintaining means by said cyclically operable means during division operations.

19. In a cyclically operable calculating machine having a frame, a carriage mounted for endwise shifting movement on said frame, and a plurality of ordinally arranged register wheels journalled on parallel axes in said carriage, certain of said wheels lying inboard of said frame and others of said wheels lying outboard thereof when said carriage is in its end position, the combination of a main transfer mechanism situated within said frame for effecting transfers in the inboard register wheels; and an auxiliary transfer mechanism mounted on said carriage for effecting transfers in the outboard register wheels, said last-named mechanism comprising a plurality of devices mounted to rotate respectively about axes parallel to the axes of said register wheels and being slidable in a direction parallel to their axes of rotation for operatively connecting the highest order inboard wheel and each outboard order wheel with the register wheel to its left for intermittently effecting the transfer of a unit thereto, means pivotally supported on said carriage and cooperating with each of said devices for shifting the same in an axial direction so as to disable the transfer of a unit from each register wheel to the next by said auxiliary transfer mechanism, and a stationary member secured to said frame for operating said shifting means for each order as the carriage is shifted so as to bring the register wheel for that order into cooperative relationship with said main transfer mechanism.

20. In a calculating machine having a frame, a carriage mounted for endwise shifting movement on said frame, a plurality of ordinally arranged register wheels in said carriage, certain of said wheels lying inboard of said frame and others of said wheels lying outboard thereof when the carriage is in an end position, and a division control mechanism, the combination of a main transfer mechanism situated within said frame for effecting transfers in the inboard register wheels; and an auxiliary transfer mechanism mounted on said carriage for effecting transfers in the outboard register wheels, said last-named mechanism including a transfer tooth connected for movement with the highest order inboard wheel, a transfer gear and a transfer tooth connected for movement with each of the outboard register wheels, a series of coupling gears for operatively connecting each transfer tooth with the transfer gear in the next higher order of the register, means for providing relative axial shifting movement between each gear of said series of coupling gears and its related transfer tooth and transfer gear so as to disable the transfer of a unit from one order of the outboard register wheels to the next, and means operable by said division control mechanism to effect such relative axial shifting movement between said coupling gears and their respectively related transfer teeth and transfer gears as to disable said auxiliary transfer mechanism to thereby prevent transfer between the orders of the outboard register wheels during the performance of a division operation.

21. In a cyclically operable calculating machine having a frame, a carriage mounted for endwise shifting movement on said frame, a plurality of ordinally arranged register wheels in said carriage, certain of said wheels lying inboard of said frame and others of said wheels lying outboard thereof when the carriage is in an end position, the combination of a main transfer mechanism situated within said frame for effecting transfers in the inboard register wheels; and an auxiliary transfer mechanism mounted on said carriage for effecting transfers in the outboard register wheels, said last-named mechanism including a transfer tooth connected for movement with the highest order inboard wheel, a transfer gear and a transfer tooth connected for movement with each of the outboard register wheels, a series of coupling gears for operatively connecting each transfer tooth with the transfer gear in the next higher order of the register, means for providing relative axial shifting movement between each gear of said series of coupling gears and its related transfer tooth and transfer gear so as to disable the transfer of a unit from one order of the outboard register wheels to the next, means for maintaining said coupling gears and their related transfer teeth and transfer gears so relatively shifted as to disable said auxiliary transfer mechanism when the machine is in a predetermined cycle condition, and a cyclically operable means for disabling said maintaining means during a predetermined portion of the machine cycle.

ANTHONY B. MACHADO.
GILMAN PLUNKETT.

REFERENCES CITED

The following references are of record in the file of this patent:

UNITED STATES PATENTS

| Number | Name | Date |
|---|---|---|
| 2,089,770 | Suter et al. | Aug. 10, 1937 |
| 2,283,655 | Stahl | May 19, 1942 |
| 2,403,069 | Friden et al. | July 2, 1946 |

FOREIGN PATENTS

| Number | Country | Date |
|---|---|---|
| 274,830 | Germany | June 3, 1914 |